United States Patent
Sakurai et al.

(10) Patent No.: US 9,264,332 B2
(45) Date of Patent: Feb. 16, 2016

(54) TRANSMISSION SYSTEM, TRANSMISSION DEVICE, PACKET LOSS RATIO MEASUREMENT METHOD, AND PACKET LOSS RATIO MEASUREMENT PROGRAM

(75) Inventors: Akira Sakurai, Tokyo (JP); Hiroshi Tanaka, Tokyo (JP); Masaki Umayabashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 14/129,075

(22) PCT Filed: Jun. 12, 2012

(86) PCT No.: PCT/JP2012/064999
§ 371 (c)(1),
(2), (4) Date: Dec. 23, 2013

(87) PCT Pub. No.: WO2013/005535
PCT Pub. Date: Jan. 10, 2013

(65) Prior Publication Data
US 2014/0146686 A1  May 29, 2014

(30) Foreign Application Priority Data
Jul. 4, 2011 (JP) ................................ 2011-147856

(51) Int. Cl.
*G01R 31/08* (2006.01)
*G06F 11/00* (2006.01)
(Continued)

(52) U.S. Cl.
CPC ........ *H04L 43/0829* (2013.01); *H04L 43/0852* (2013.01); *H04L 43/0835* (2013.01); *H04L 43/0841* (2013.01); *H04L 43/106* (2013.01)

(58) Field of Classification Search
CPC ................................................ H04L 43/0829
See application file for complete search history.

(56) References Cited

U.S. PATENT DOCUMENTS

2008/0080390 A1* 4/2008 Ebuchi et al. ................. 370/253
2009/0196188 A1 8/2009 Taketoshi et al.
(Continued)

FOREIGN PATENT DOCUMENTS

EP 1 734 690 A1 12/2006
EP 2 242 236 A1 10/2010
(Continued)

OTHER PUBLICATIONS

Frost S. Bryant Cisco Systems D: "Packet Loss and Delay Measurement for MPLS Networks; draft-ietf-mpls-loss-delay-03.txt", Packet Loss and Delay Measurement for MPLS Networks; draft-ietf-mipls-loss-delay-03.txt, Internet Engineering Task Force, IETF; Standardworkingdraft, Internet Society (ISOC) 4, Rue Des Falaises CH-1205 Geneva, Switzerland, No. 3, Jun. 30, 2011, pp. 150.

(Continued)

*Primary Examiner* — Maharishi Khirodhar
(74) *Attorney, Agent, or Firm* — McGinn IP Law Group, PLLC

(57) ABSTRACT

In a transmission system capable of measuring packet loss ratio between arbitrary devices upon a transmission path without increasing bandwidth of an OAM frame band, a plurality of transmission devices which have been disposed upon a transmission path are provided with a frame analysis unit which receives data frames so as to analyze the type of the data frames, a count processing unit which stores the number of received frames included in the data frames into storage module provided beforehand, an output line end portion which outputs the data frames, and an OAM processing unit which calculates the packet loss ratio in the transmission path using the number of received frames. The frame analysis unit has a function which, if the data frames are OAM frames, copies the data frames and the OAM processing unit has a function which calculates the packet loss ratio using the copied OAM frames.

10 Claims, 9 Drawing Sheets

(51) Int. Cl.
  *G08C 15/00* (2006.01)
  *H04L 12/26* (2006.01)

(56) References Cited

U.S. PATENT DOCUMENTS

| | | | |
|---|---|---|---|
| 2010/0008250 A1 | 1/2010 | Nomura et al. | |
| 2010/0020698 A1 | 1/2010 | Kondo | |
| 2010/0302949 A1* | 12/2010 | Fukagawa | 370/241.1 |

FOREIGN PATENT DOCUMENTS

| | | | |
|---|---|---|---|
| GB | 2461966 A | 1/2010 |
| JP | 09-200228 A | 7/1997 |
| JP | 2002-152266 A | 5/2002 |
| JP | 2008-017407 A | 1/2008 |
| JP | 2008-085906 A | 4/2008 |
| JP | 2008-244870 A | 10/2008 |
| JP | 2009-182925 A | 8/2009 |
| JP | 2010-028654 A | 2/2010 |
| JP | 2010-206691 A | 9/2010 |
| WO | WO 2008/117379 A1 | 10/2008 |
| WO | WO 2009/098757 A1 | 8/2009 |

OTHER PUBLICATIONS

Maarten Vissers Huawei Technologies co et al: "Proposal of Proactive LMM/LMR for inclusion in Y.1731;15", ITU-T Draft; Study Period 2009-2012, International Telecommunication Union, Geneva; CH, vol. 9, 10, Jun. 6, 2011, pp. 1-11.

Extended European Search Report dated Jan. 21, 2015 (English version).

International Search Report (ISR) (PCT Form PCT/ISA/210), in PCT/JP2012/064999, dated Sep. 18, 2012.

"ITU-T Recommendation Y. 1731-OAM functions and mechanisms for Ethernet based networks", Jan. 31, 2006, International Telecommunication Union (ITU), (Searched on May 20, 2011), Internet <URL: http://www. itu.int/itudoc/itu-t/aap/sg 13 aap/ recaap/y1731/ >.

\* cited by examiner

TRANSMISSION SYSTEM, TRANSMISSION DEVICE, PACKET LOSS RATIO MEASUREMENT METHOD, AND PACKET LOSS RATIO MEASUREMENT PROGRAM

The present application is based on and claims priority from International Application No. PCT/JP2012/064999, filed on Jun. 12, 2012, which is based on and claims priority from Japanese Patent Application No. 2011-147856, filed on Jul. 4, 2011, the entire contents of which are incorporated herein by reference.

TECHNICAL FIELD

The present invention relates to a transmission system, a transmission device, a packet loss ratio measurement method, and a packet loss ratio measurement program. More specifically, the present invention relates to a transmission system and the like capable of making it possible to efficiently measure the packet loss ratio between arbitrary devices on a transmission path.

BACKGROUND ART

Ethernet (registered trademark) is a communication standard widely used in a computer network (LAN: Local Area Network) of a small scale area such as a network built within a same building. Recently, in order to reduce the network operation cost and the like, there is presented a type of network in which functions regarding network remote surveillance are added to Ethernet for expanding Ethernet to be used for WAN (Wide Area Network) which is a larger scale network. This is called Ethernet OAM (Operations, Administrations, Maintenance).

The Ethernet OAM is standardized as Y.1731 by ITU-T (International Telecommunication Union Telecommunication Standardization Sector) in 2006. Non-Patent Document 1 is the document of the standardization of Y.1731. Further, IEEE (the Institute of Electrical and Electronics Engineers, Inc.) also standardized it as IEEE 802.1ag in 2007.

In Non-Patent Document 1, a single end LM (Loss Measurement) protocol that is one of protocols used in the network remote surveillance is defined. The single end LM is a two-way protocol (bidirectional) with which a transmission device of one end transmits a message and a transmission device on another end upon receiving it returns a massage.

In the single end LM protocol, a part of the data packet transmission path on the network is defined as a maintenance section called MEG (Maintenance Entity Group), and the end point of the maintenance section is defined as MEP (Maintenance Entity Group End Point). Then, through transmitting and receiving OAM frames between the defined MEPs, the network remote surveillance functions such as failure surveillance, performance measurement, and protection switching are achieved.

With the single end LM protocol depicted in Non-Patent Document 1, the packet loss ratio that is the data packet loss generation ratio between MEPs is calculated by exchanging the transmission/reception numbers of user frames between MEPs that are the both ends of the maintenance section (MEG). Hereinafter, calculation of the packet loss ratio will be described.

FIG. 6 is an explanatory chart showing the structure of a transmission network 901 that is the target of the packet loss ratio calculation by the single end LM protocol depicted in Non-Patent Document 1. The transmission network 901 is constituted by connecting a plurality of transmission devices 910a, 910b,—(referred to as the transmission devices 910 as a general term hereinafter) disposed on a transmission path 930 for relaying communication OAM frames via the transmission path 930 and an operation management device 920 which executes operation managements of those transmission devices 910.

Note here that the four transmission devices 910a to d are disposed on the transmission path 930. A point-to-point transmission network (MEG: Maintenance Entity Group) is constituted by having the transmission devices 910a and 910d among those as both end points (MEP: Maintenance Entity Group End Point) and the transmission 910b and 910c as the relay points. Further, transmission from the transmission device 910a to 910d is referred to as the forward direction, and transmission from the transmission device 910d to 910a is referred to as the reverse direction.

FIG. 7 is an explanatory chart showing the actions for measuring the packet loss ratio between the transmission devices 910a and 910d on the transmission path 930 shown in FIG. 6. First, a first LMM frame including a latest transmission counter value TxFCf (a1) of the device itself is transmitted from the transmission device 910a to the transmission device 910d (step S950a).

The transmission device 910d upon receiving the first LMM frame adds a latest reception counter value RxFCf (d1) of the device itself within the first LMM frame (step S950a), generates a first LMR frame as a response for the first LMM frame, adds a latest transmission counter value TxFCb (d1) of the device itself thereto, and transmits it to the transmission device 910a (step S951d).

The transmission device 910a upon receiving the first LMR frame refers to the latest reception counter value RxFCb (a1) (step S951a). Then, the transmission device 910a transmits a second LMM frame after a predetermined waiting time (100 msec, for example) has passed from the transmission of the first LMM frame (step S952a). The second LMM frame contains a transmission counter value TxFCf (a2).

As in steps S950d and 951d described above, the transmission device 910d upon receiving the second LMM frame adds a latest reception counter value RxFCf (d2) to the received second LMM frame (step 952d), generates a second LMR frame that is the response for the second LMM frame, adds a latest transmission counter value TxFCb (d2) of the device itself, and transmits it to the transmission device 910a (step S953d).

The transmission device 910a upon receiving the second LMR frame refers to the latest reception counter value RxFCb (a2) (step S953a), and calculates the frame loss number by following Expression 1. Note, however, that || shows that it is an arithmetic operation between modulo 32 (32-bit integer with no signs). For example, |0x00000001−0xFFFFFFFF|=2.

(Expression 1)

Forward direction frame transmission number = $|TxFCf(a2) - TxFCf(a1)|$

Forward direction frame loss number =

$|TxFCf(a2) - TxFCf(a1)| - |RxFCf(d2) - RxFCf(d1)|$

Reverse direction frame transmission number = $|TxFCb(d2) - TxFCb(d1)|$

Reverse direction frame loss number =

$|TxFCb(d2) - TxFCb(d1)| - |RxFCb(a2) - RxFCb(a1)|$

Thereby, frame loss number frame transmission number, i.e., the packet loss ratio, in both directions can be calculated with MEGs constituted between the transmission devices 910*a* and 910*d* that are MEPs.

Relating to that, there are following technical documents, for example. Among those, depicted in Patent Document 1 is a frame loss measurement method which, when a relay device receives an OAM frame, identifies the frame transmission/reception number in each section by writing the frame counter value of that device into the OAM frame and relaying it. Depicted in Patent Document 2 is a packet loss measurement system which collects flows constituting the traffic on a network, counts the flows from the start of a measurement, and calculates the packet loss ratio from the flow information of a same account.

Depicted in Patent Document 3 is a packet loss ratio calculation system which adds a transmission counter and a reception counter to quality measurement packets on both probes of the transmission side and the reception side and transmits/receives those to calculate the packet loss ratio of the outward and inward paths thereby. Depicted in Patent Document 4 is a monitoring method which compares BROAM cells transmitted/received mutually between the end points of a network and specifies the performance deteriorated section.

Patent Document 1: Japanese Unexamined Patent Publication 2008-244870
Patent Document 2: Japanese Unexamined Patent Publication 2002-152266
Patent Document 3: Japanese Unexamined Patent Publication 2008-085906
Patent Document 4: Japanese Unexamined Patent Publication Hei 09-200228
Non-Patent Document 1: "ITU-T Recommendation Y. 1731-OAM functions and mechanisms for Ethernet based networks", Jan. 31, 2006, International Telecommunication Union (ITU), (Searched on May 20, 2011), Internet<URL: http://www.itu.int/itudoc/itu-t/aap/sg13aap/recaap/y1731/>

Loss of the data packet stops the communication on the network or causes a great deterioration in the communication speed and the communication quality, so that the packet loss ratio needs to be suppressed to a specific numerical value or less. In order to do so, it is necessary to quickly specify the occurrence point of a failure (e.g., cut in the optical fiber, fault generated in the transmission device, or the like) which may cause the packet loss on the transmission path.

However, the method of the single end LM protocol depicted in Non-Patent Document 1 shown in FIG. 6 and FIG. 7 can only measure the packet loss ratio in MEG by having transmission devices at specific two points on the transmission path as MEPs and taking those MEPs as both ends.

FIG. 8 is an explanatory chart showing the method for specifying a fault occurrence point, which is the packet loss ratio measurement method depicted in Non-Patent Document 1 shown in FIG. 6 and FIG. 7. For example, in a case where a high packet loss ratio is measured by having the transmission devices 910*a* to 910*d* as MEG (end-end surveillance section), it is necessary to designate more fractionated sections (segment surveillance sections) such as the segments between the transmission devices 910*a* to 910*b*, between 910*b* to 910*c*, and the like as MEG for specifying the occurrence point.

With the specifying method shown in FIG. 8, it is necessary to start a new OAM session individually for each of the fractionated MEGs. This causes complication in the management for setting each session. Further, each of the sessions transmits/receives the OAM frame by each MEG without synchronizing with each other, so that the measurement time in each MEG is not necessarily consistent. Thus, there are cases where there is no same phenomenon occurred even when the measurement results of each session are collated. In such case, it is difficult to specify the occurrence point.

The technique depicted in Patent Document 1 is designed to overcome such issue. However, with this technique, it is necessary to execute a series of processing such as "discriminate the OAM frame→acquire the latest reception counter value→write the acquired reception counter value to the OAM frame→transmit the OAM frame" for the received OAM frame in each of the relay devices existing on the transmission path.

FIG. 9 is an explanatory chart showing an example where the frame transmission order is inverted in the relay device existing in the middle of MEG on the transmission path, which is the packet loss ratio measurement method depicted in Non-Patent Document 1 shown in FIG. 6 to FIG. 8. A thick-line arrow shows the OAM frame, and a thin-line arrow shows the user frame, respectively.

With the LM protocol, a strict order characteristic is required between the user frame and the OAM frame. When there is an inversion of the transmission order occurred as shown in FIG. 9, the counter value contained in the OAM frame becomes invalid, so that an accurate packet loss ratio cannot be calculated.

Therefore, the technique which requires actions for adding new data by processing the OAM frame in the relay device in the middle of the transmission path such as the technique depicted in Patent Document 1 has a risk of causing inversion of the transmission order as shown in FIG. 9. That is, such action for adding new data needs to be executed at a same speed as that of the regular data frame (user frame) transfer. Thus, a high performance is required for the hardware and software which execute that processing.

Further, when new data is added to the OAM frame in the relay device in the middle of the transmission path, the band of the OAM frame itself is increased thereby. Particularly, when transmission is done via multiple stages of relay devices, new data is to be added every time when going through the relay device. Thus, the band is increased greatly. In accordance with the increase in the band, a new frame loss is to be generated.

Therefore, when applying such technique, it is necessary to take a measure such as predicting in advance the increase in the band generated according to the measurement of the packet loss ratio and restricting the band of the user frame coming in from MEP in the measurement section, for example.

All the techniques depicted in Patent Documents 2 to 4 add new data to the data that is being transmitted as in the technique of Patent Document 1. That is, none of the techniques depicted in Patent Documents 1 to 4 can overcome the above-described issue. It is the same even when those techniques are combined.

The object of the present invention is to provide a transmission system, a transmission device, a packet loss ratio measurement method, and a packet loss ratio measurement program, which are capable of measuring the packet loss ratio between arbitrary devices on a transmission path without increasing the band of the OAM frame.

DISCLOSURE OF THE INVENTION

In order to achieve the foregoing object, the transmission system according to the present invention is characterized as a transmission system including, on a transmission path, a plurality of transmission devices which transmit a data frame received from another device to a next device, thereby sequentially transmitting the data frame on the transmission path, wherein: each of the transmission devices includes a frame analysis unit which receives the data frame transmitted from another device via the transmission path and analyzes a type of the data frame, a count processing unit which stores a received frame number contained in the data frame to a storage module provided in advance, an output line end portion which outputs the data frame towards the next device, and an OAM processing unit which calculates a packet loss ratio on the transmission path by using the received frame number. The frame analysis unit includes a function which, when the data frame is an OAM frame, copies the OAM frame, and the OAM processing unit includes a function which calculates the packet loss ratio on the transmission path by using the copied OAM frame and the received frame number stored in the storage module.

In order to achieve the foregoing object, the transmission device according to the present invention is characterized as a transmission device transmitting a data frame received from another device to a next device, a plurality of which being disposed on a transmission path, and the transmission device includes: a frame analysis unit which receives the data frame transmitted from another device via the transmission path and analyzes a type of the data frame, a count processing unit which stores a received frame number contained in the data frame to a storage module provided in advance, an output line end portion which outputs the data frame towards the next device, and an OAM processing unit which calculates a packet loss ratio on the transmission path by using the received frame number. The frame analysis unit includes a function which, when the data frame is an OAM frame, copies the OAM frame, and the OAM processing unit includes a function which calculates the packet loss ratio on the transmission path by using the copied OAM frame and the received frame number stored in the storage module.

In order to achieve the foregoing object, the packet loss ratio measurement method according to the present invention is used in a transmission system which includes, on a transmission path, a plurality of transmission devices which transmit a data frame received from another device to a next device, thereby sequentially transmitting the data frame on the transmission path, wherein: a frame analysis unit of the transmission device receives the data frame transmitted from another device via the transmission path and analyzes a type of the data frame; when the data frame is an OAM frame, the frame analysis unit of the transmission device copies the OAM frame; a count processing unit of the transmission device stores a received frame number contained in the data frame to a storage module provided in advance; the OAM processing unit of the transmission device calculates a packet loss ratio on the transmission path by using the copied OAM frame and the received frame number stored in the storage module; and an output line end portion of the transmission device outputs the data frame towards the next device.

In order to achieve the foregoing object, the packet loss ratio measurement program according to the present invention is used in a transmission system which includes, on a transmission path, a plurality of transmission devices which transmit a data frame received from another device to a next device, thereby sequentially transmitting the data frame on the transmission path, and the program is characterized to cause a computer provided to the transmission device to execute: a procedure for receiving the data frame transmitted from another device via the transmission path and analyzing a type of the data frame; when the data frame is an OAM frame, a procedure for copying the OAM frame; a procedure for storing a received frame number contained in the data frame to a storage module provided in advance; a procedure for calculating a packet loss ratio on the transmission path by using the copied OAM frame and the received frame number stored in the storage module; and a procedure for outputting the data frame towards the next device.

As described above, the present invention is structured to copy the OAM when the data frame is the OAM frame and calculate the packet loss ratio by using the copied OAM frame, so that there is no issue generated regarding the processing amount and the processing time associated with the data adding processing described above. This makes it possible to provide the transmission system, the transmission device, the packet loss ratio measurement method, and the packet loss ratio measurement program, which exhibit such an excellent characteristic that it is possible to measure the packet loss ratio between arbitrary devices on the transmission path without increasing the band of the OAM frame.

BEST MODES FOR CARRYING OUT THE INVENTION

Embodiment

Figure 1:
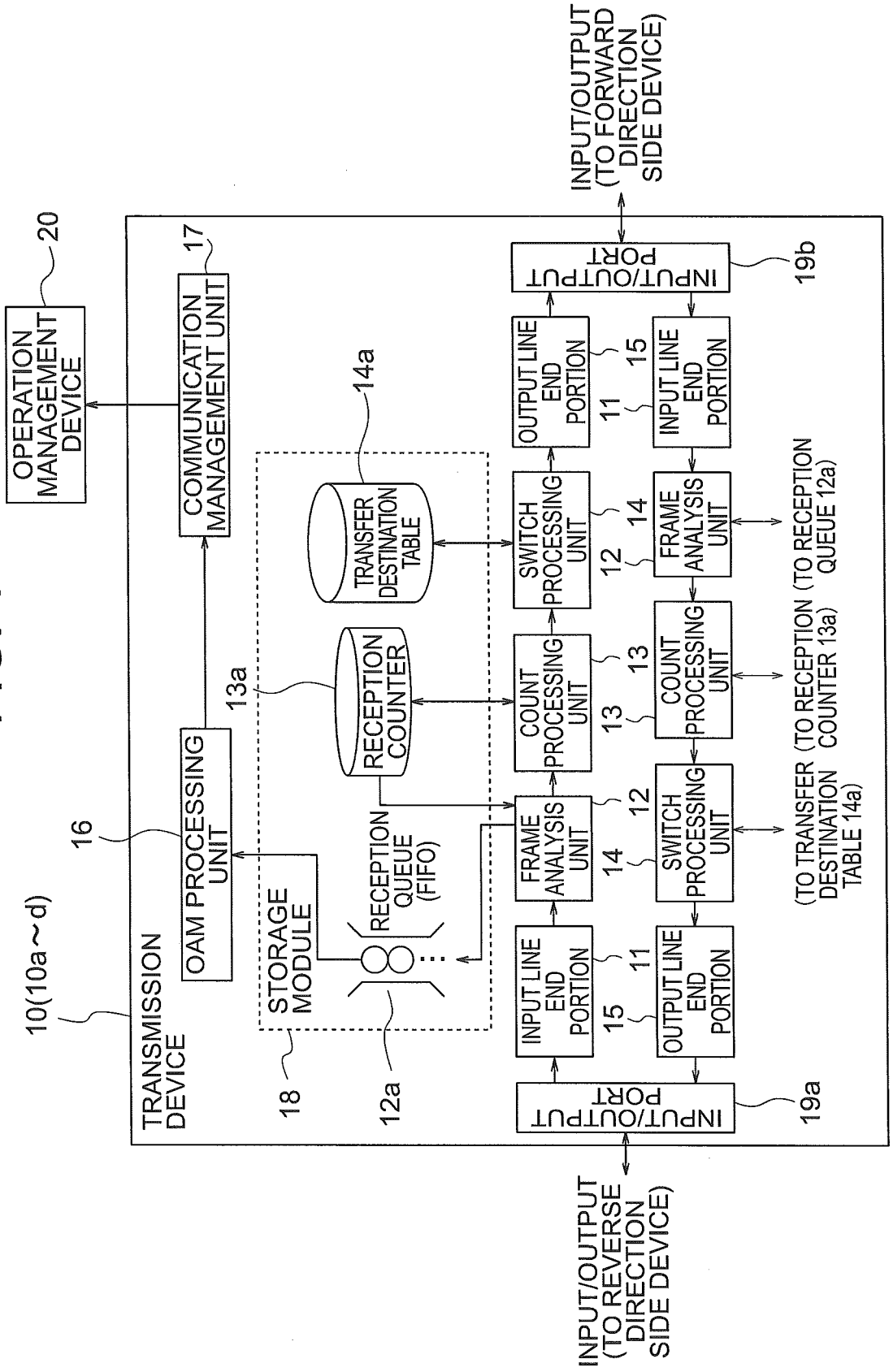
FIG. 1 is an explanatory chart showing more detailed structures of a transmission device shown in FIG. 2.

Hereinafter, structures of an embodiment of the present invention will be described by referring to the accompanying drawing FIG. 1.

The basic contents of the embodiment will be described first, and more specific contents will be described thereafter.

A transmission system (transmission network 1) according to the embodiment is a system which includes, on a transmission path 30, a plurality of transmission devices 10 which transfer a data frame received from another device to a next device, thereby transmitting the data frame successively on the transmission path. Note here that each of the transmission devices 10 includes: a frame analysis unit 12 which receives the data frame transmitted from another device via the transmission path and analyzes the type of the data frame; a count processing unit 13 which stores the received frame number contained in the data frame to a storage module 18 provided in advance; an output line end portion 15 which outputs the data frame towards the next device; and an OAM processing unit 16 which calculates the packet loss ratio on the transmission path by using the received frame number. The frame analysis unit includes a function which, when the data frame is an OAM frame, copies the OAM frame. The OAM processing unit includes a function which calculates the packet loss ratio on the transmission path by using the copied OAM frame and the received frame number stored in the storage module.

Further, after copying the OAM frame, the frame analysis unit 12 outputs the loss measurement OAM frame that is the original of the copy to the output line end portion as it is. Further, the transmission system (transmission network 1) includes an operation management device 20 which receives and totalizer the packet loss ratios on the transmission path calculated in each of the transmission devices and calculates the packet loss ratios between each of the transmission devices. The OAM frame herein uses a single end LM (Loss Management) protocol.

With the above-described structures, the transmission system (transmission network 1) according to the embodiment can measure the packet loss ratio between arbitrary devices on the transmission path without increasing the band of the OAM frame. Hereinafter, this will be described in more details.

Figure 2:
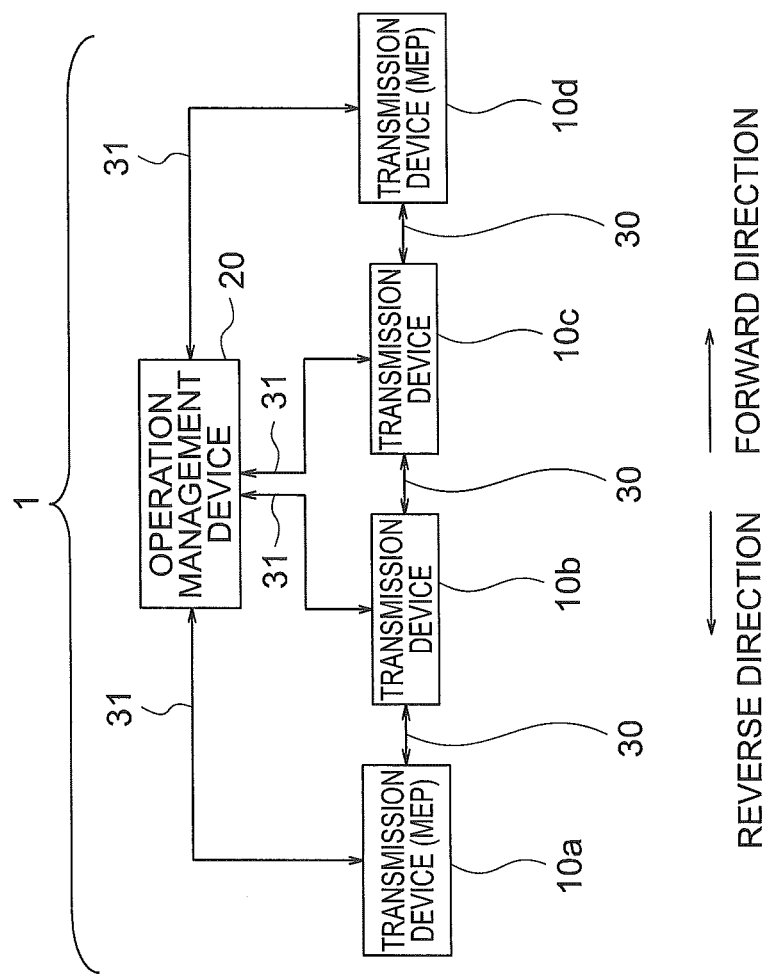
FIG. 2 is an explanatory chart showing structures of a transmission network according to an embodiment of the present invention.

FIG. 2 is an explanatory chart showing the structures of the transmission network 1 according to the embodiment of the present invention. The transmission network 1 is constituted by connecting a plurality of transmission devices 10a, 10b,— (referred to as the transmission devices 10 as a general term hereinafter) disposed on the transmission path 30 for relaying communication OAM frames via the transmission path 30 and the operation management device 20 which executes operation managements of those transmission devices 10.

While four transmission devices 10a to d are shown as a way of example, there are any numbers of transmission devices 10 being provided. The MEG (Maintenance Entity Group) that is the point-to-point transmission network is built with those transmission devices 10a to 10d. The transmission devices 10a and 10d among those are the both end points (MEP: Maintenance Entity Group End Point), and the transmission devices 10b and 10c are the relay points. Hereinafter, the direction of the transmission devices 10a→10d is referred to as the forward direction, and the opposite direction thereof is referred to as the reverse direction.

Regarding the transmission path 30, the kind of transmission method is not specifically limited to an optical cable, a metal cable, a wireless type, or the like. Further, the transmission devices 10 and the operation management device 20 are connected via a management network 31 that is of a system different from the transmission path 30. The transmission method of the management network 31 is also arbitrarily selected. Further, management signals connecting the transmission device 10 and the operation management device 20 may be superimposed on the transmission path 30. The operation management device 20 is a regular computer device.

FIG. 1 is an explanatory chart showing the more detailed structures of the transmission device 10 shown in FIG. 2. Each of the transmission devices 10 includes: an input/output port 19a which converts input/output signals from the reverse direction side of the transmission path 30 between optical signals and electric signals; and an input/output port 19b which also converts input/output signals from the forward direction side of the transmission path 30 between optical signals and electric signals.

The transmission device 10 further includes: an input/output line end portion 11 which converts electric signals to communication signals by executing processing as a layer 1 (physical layer) of the OSI reference model on the electric signals converted from the optical signals by the input/output orts 19a and 19b; and the frame analysis unit 12 which extracts the OAM frame from the communication signals converted and outputted by the input line end portion 11 and identifies the content thereof The transmission device 10 further includes: the count processing unit 13 which extracts the received frame number as one of the data contained inside the received OAM frame; a switch processing unit 14 which determines which of the input/output ports 19a and 19b the OAM frame is to be outputted; and the output line end portion 15 which executes processing as the layer 1 (physical layer) on the OAM frame (reverse processing with respect to the case of the input line end portion 11 described above) to convert the signals to the electric signals and transmits the electric signals to the input/output port 19a or 19b determined by the switch processing unit 14. Each of the input line end portion 11, the frame analysis unit 12, the count processing unit 13, the switch processing unit 14, and the output line end portion 15 is provided with equivalent structures for the transmission directions in each of the forward direction and the reverse direction.

The count processing unit 13 stores the extracted frame reception number as a reception counter 13a. The switch processing unit 14 determines which of the input/output ports 19a and 19b to be selected as the output port of the OAM frame by using a transfer destination table 14a that is the data given in advance. Referring to the transmission device 10b shown in FIG. 1 as an example, it is possible to set a rule in the transfer destination table 14a in advance regarding determination of the output port in such a manner to output the received frame to the input/output port 19b to transfer it towards the transmission device 10c in a case where the received frame is from the input/output port 19a side and to output the received frame to the input/output port 19a to transfer it towards the transmission device 10a in a case where the received frame is from the input/output port 19b side.

The frame analysis unit 12 outputs the received OAM frames to a reception queue 12a in a FIFO manner. The frame analysis unit 12 further includes a function which generates a copy of the received OAM frame in the manner described later and outputs the received frame number stored in the reception counter 13a to the reception queue 12a in a FIFO manner.

The OAM processing unit 16 executes calculation of the packet loss ratio regarding the OAM frames extracted from the reception queue 12a in a FIFO manner. The communication management unit 17 collects the calculation results of the packet loss ratios and the like done by the OAM processing unit 16, and transmits the results to the operation management device 20 via the management network 31.

Note here that the reception queue 12a, the reception counter 13a, and the transfer destination table 14a are all memory regions secured on the storage module 18 or data stored in the memory regions. The input line end portion 11, the frame analysis unit 12, the count processing unit 13, the switch processing unit 14, the output line end portion 15, the OAM processing unit 16, and the communication management unit 17 may be achieved as electric circuits, computer programs operated on a microprocessor, or combinations of the electric circuits and the programs.

Processing Executed inside Transmission Device

Figure 3:
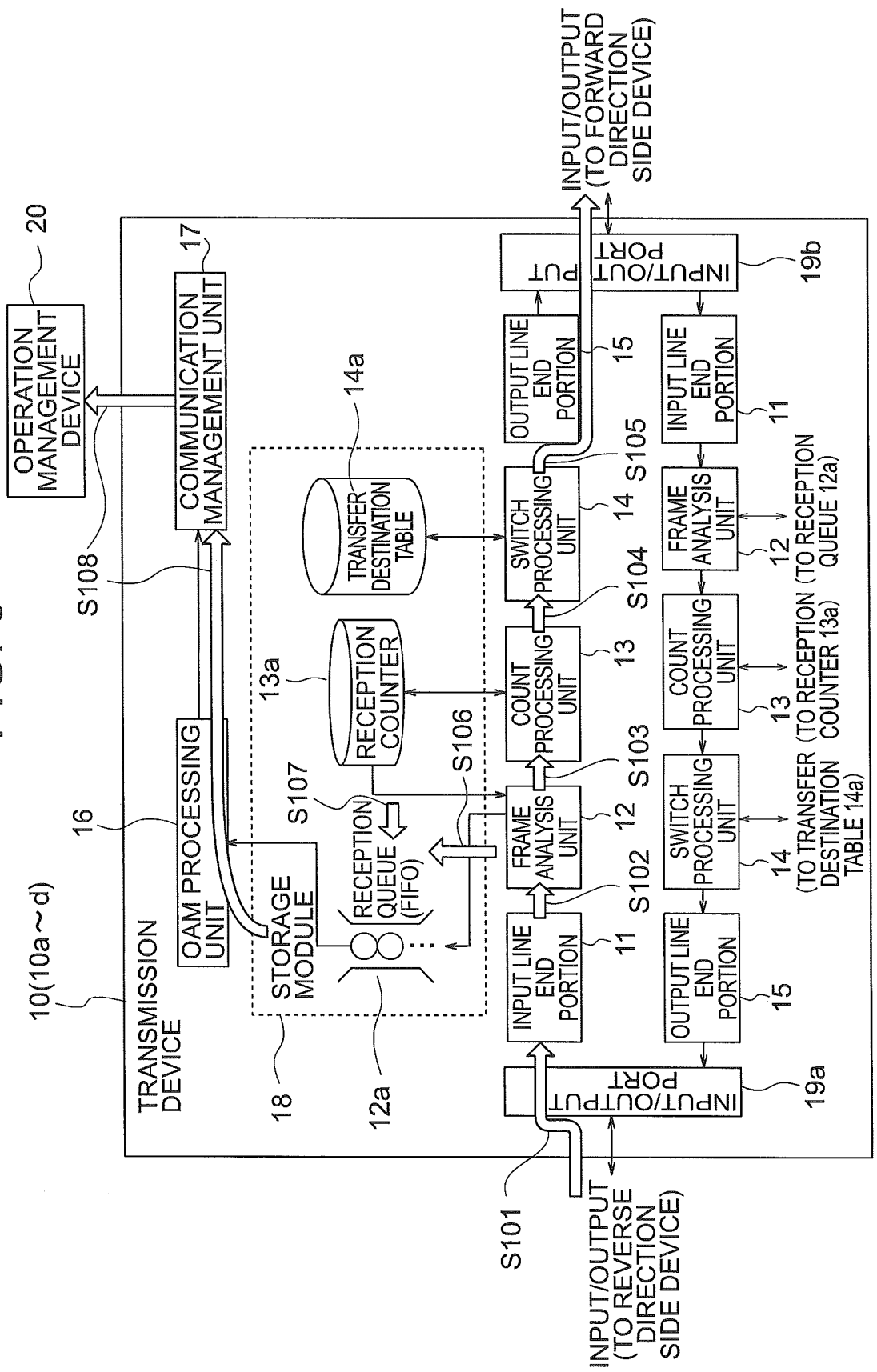
FIG. 3 is an explanatory chart showing the flow of the processing executed inside the transmission device shown in FIG. 1.
Figure 4:
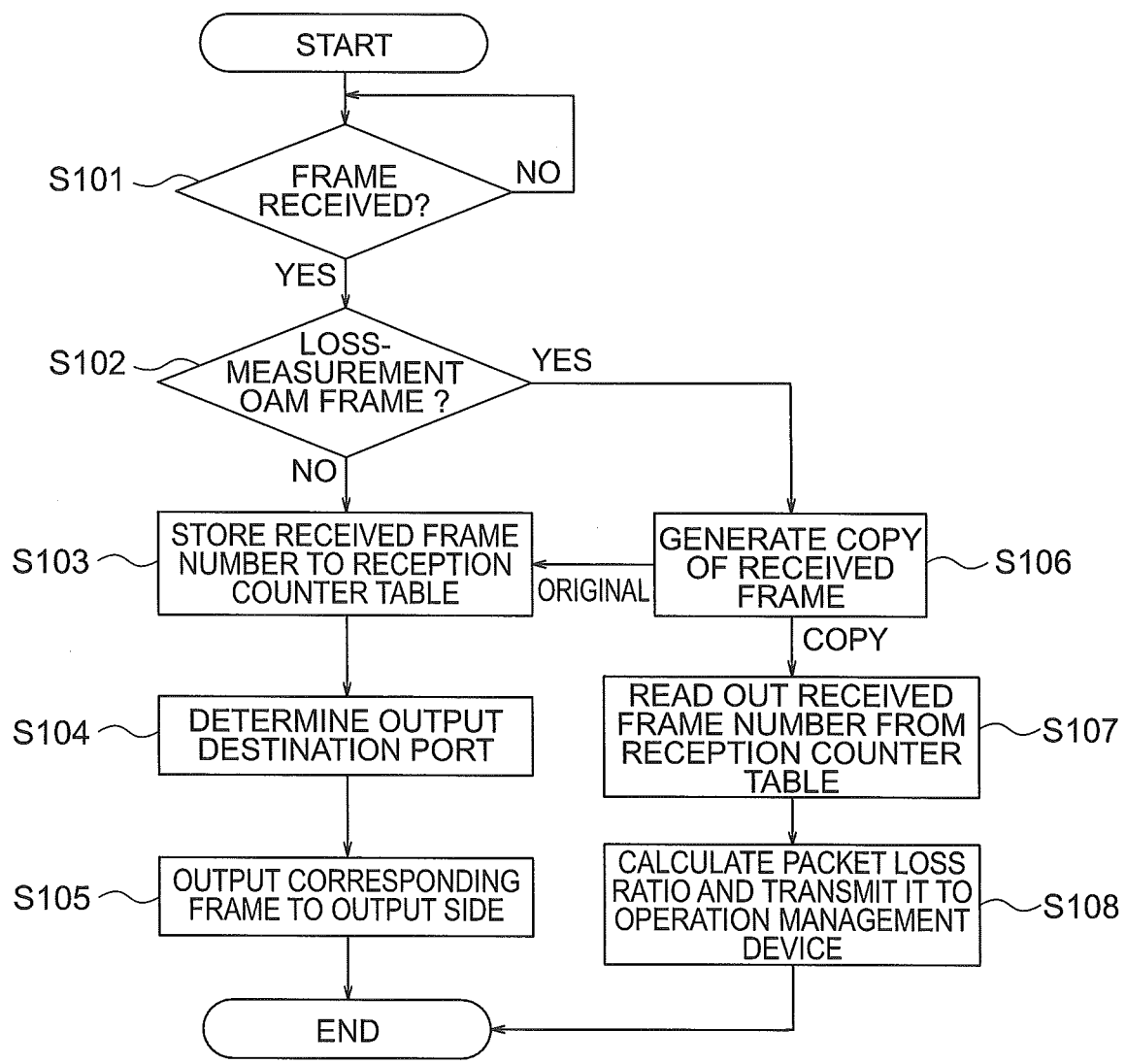
FIG. 4 is a flowchart showing the flow of the processing executed inside the transmission device shown in FIG. 3.

FIG. 3 is an explanatory chart showing the flow of processing executed inside the transmission device 10 shown in FIG. 1. FIG. 4 is a flowchart showing the flow of processing executed inside the transmission device 10 shown in FIG. 3. While the flow of the processing in the forward-side transmission direction is shown in FIG. 3, the similar processing is executed for the transmission of the reverse-side direction in the similar flow. When the input line end portion 11 receives a user frame from the input side of the transmission path 30 (step S101), the frame analysis unit 12 discriminates the type of the received frame based on the header information of the received user frame (step S102).

The header information herein means Ethertype values as identifiers of the types of the received frames, OpCode values as identifiers of functions of the received frames, and the like defined in Non-Patent Document 1. In a case where the information does not correspond to the loss measurement OAM frame, the frame analysis unit 12 transfers the received frame to the count processing unit 13. The count processing unit 13 extracts the received frame number RxFC from the received frame, and stores it to the reception counter 13a (step S103).

Subsequently, the switch processing unit 14 refers to the transfer destination table 14a based on the header information (destination MAC address and the like) of the received frame, and determines the output destination port (step S104). Then, the output line end portion 15 outputs the frame to the output side of the transmission path 30 towards the determined output destination port (step S105), and the processing is ended.

For determining the output destination port of the received frame by the switch processing unit 14, it is possible to set the rule in the transfer destination table 14a in advance regarding determination of the output port in such a manner to output the received frame to the input/output port 19b to transfer it towards the transmission device 10c in a case where the received frame is from the input/output port 19a side and to output the received frame to the input/output port 19a to transfer it towards the transmission device 10a in a case where the received frame is from the input/output port 19b side, for example. Each processing regarding the determination of the output destination port and the output to the output destination port by the output line end portion 15 is not within the scope of the present invention, so that details thereof are not described herein.

In a case where the type of the received frame discriminated by the frame analysis unit 12 in step S102 is the loss-measurement OAM frame, the frame analysis unit 12 generates a copy of the received frame and stores it to the reception queue 12a (step S106).

Further, the frame analysis unit 12 reads out the value of the received frame number RxFC stored in the reception counter 13a, and also stores it to the reception queue 12a (step S107). Then, the OAM processing unit 16 takes out the received frame after being copied and the value of the received frame number RxFC from the reception queue 12a, executes the processing for calculating the packet loss ratio by using it, and the communication management unit 17 transmits the measurement result of the calculated packet loss ratio to the operation management device 20 (step S108). Thereby, the processing is ended.

After generating the copy of the received frame in step S106, the frame analysis unit 12 gives the received frame that is the original from which the copy is made to the count processing unit 13. The same processing as that of steps S103 to 105 is executed by the count processing unit 13, the switch processing unit 14, and the output line end portion 15, and the processing is ended.

Calculation of Packet Loss Ratio

Figure 5:
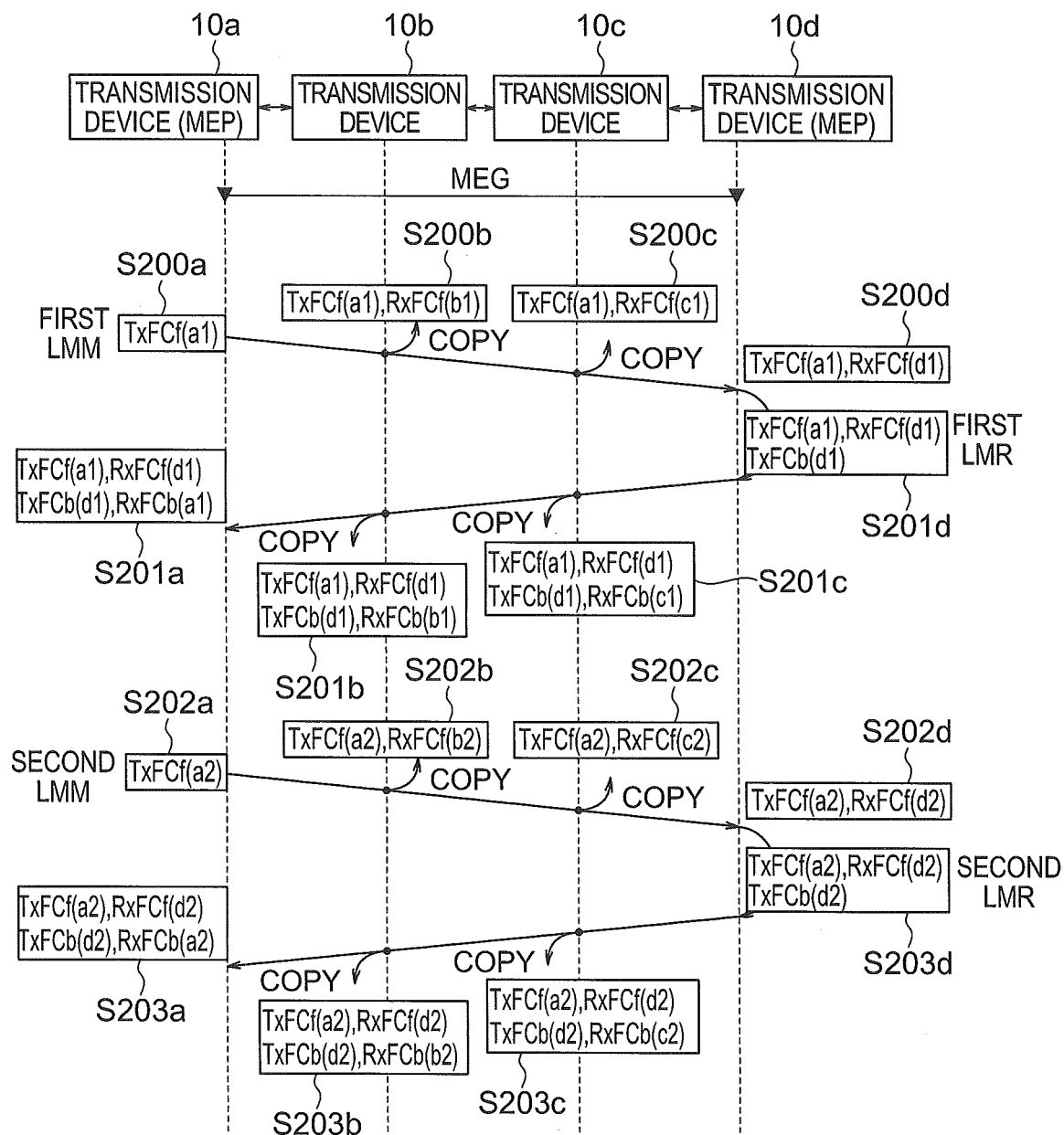
FIG. 5 is an explanatory chart showing actions of the transmission device shown in FIG. 1 and FIG. 2 when measuring the packet loss ratio on a transmission path shown in FIG. 2.
Figure 6:
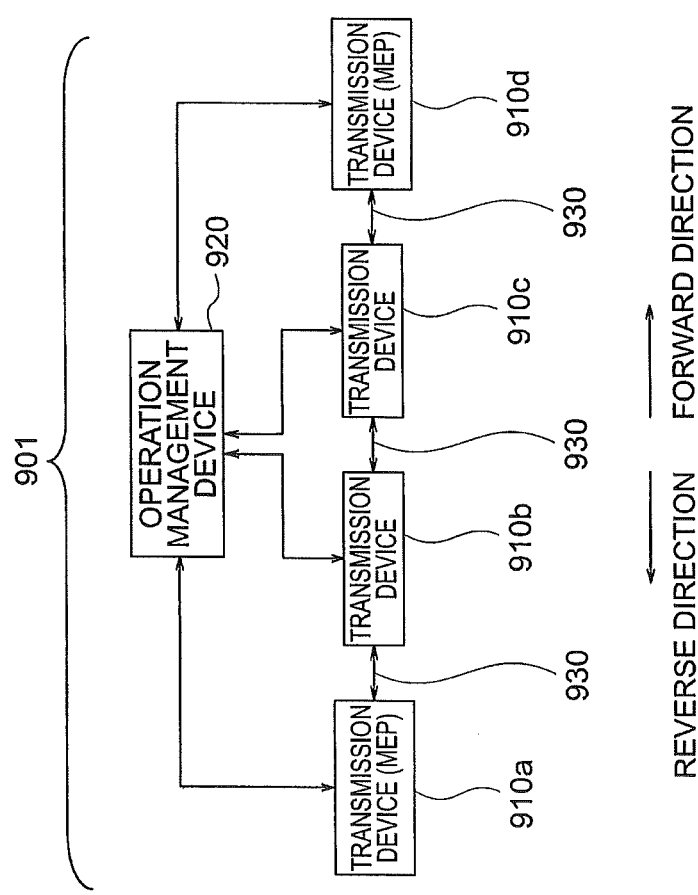
FIG. 6 is an explanatory chart showing structures of a transmission network that is the target of packet rate calculation by a single end LM protocol depicted in Non-Patent Document 1.
Figure 7:
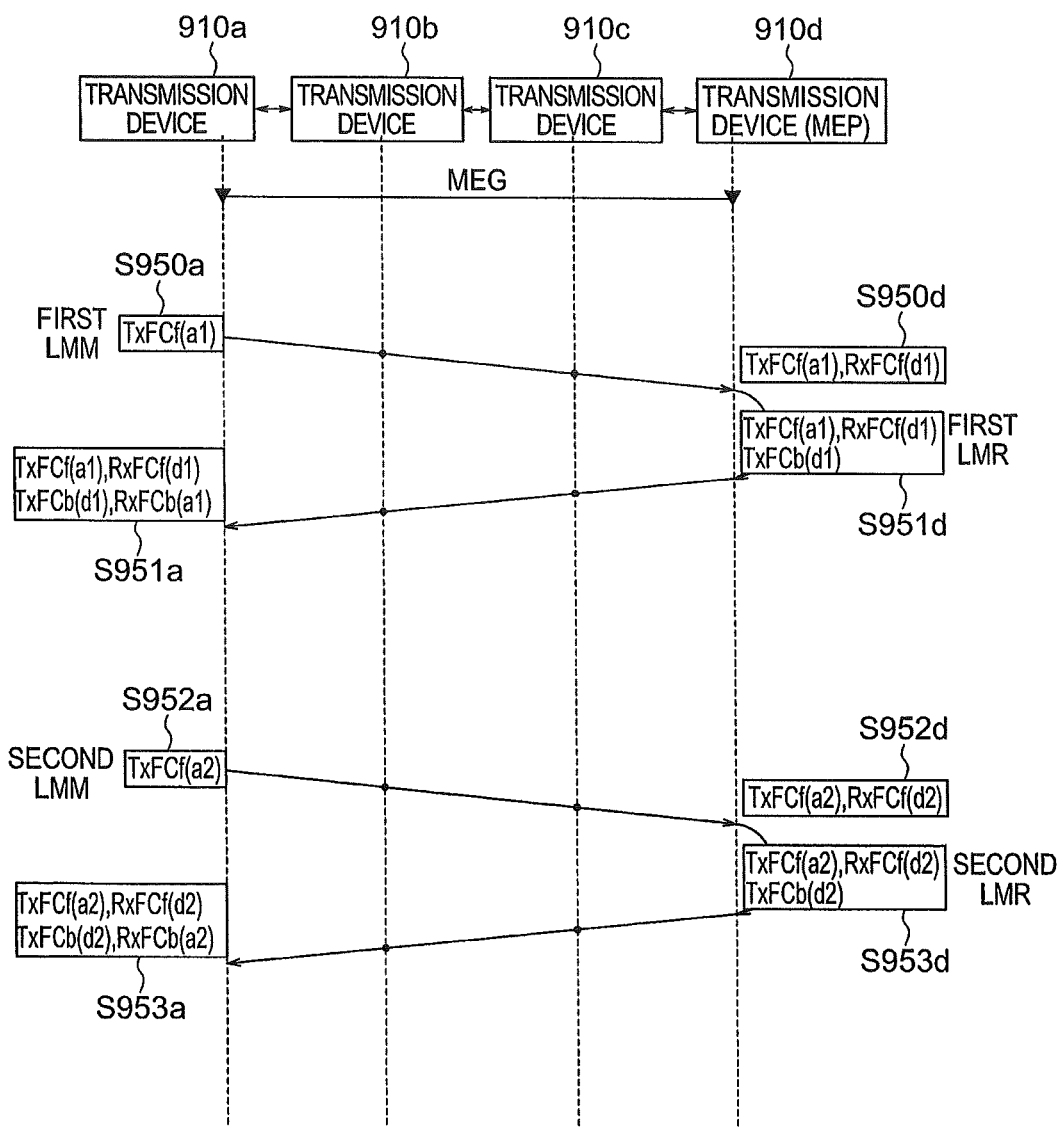
FIG. 7 is an explanatory chart showing actions for measuring the packet loss ratio between transmission devices on a transmission path shown in FIG. 6.
Figure 8:
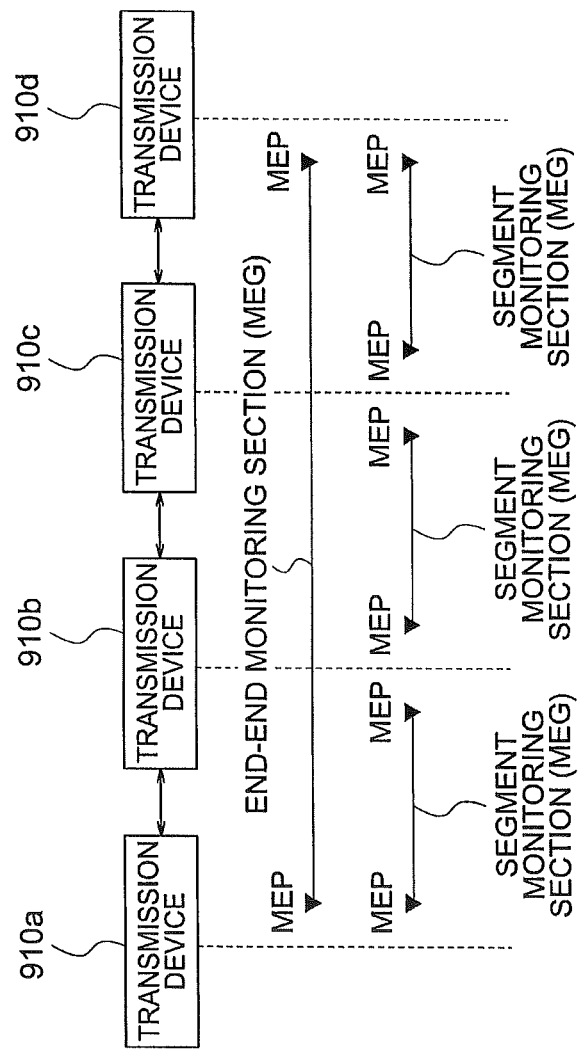
FIG. 8 is an explanatory chart showing a method for specifying a fault occurrence point in the packet loss ratio measurement method depicted in Non-Patent Document 1 shown in FIG. 6 to FIG. 7.

FIG. 5 is an explanatory chart showing actions of the transmission device 10 shown in FIG. 1 and FIG. 2 when measuring the packet loss ratio on the transmission path 30 shown in FIG. 2. As shown in FIG. 2, MEG is constituted with the four transmission devices 10a to 10d disposed on the transmission path 30. The transmission devices 10a and 10d among those are the both end points (MEP), and the transmission devices 10b and 10c are the relay points. Transmission from the transmission devices 10a to 10d is referred to as the forward direction, and transmission from the transmission devices 10d to 10a is referred to as the reverse direction.

As described in the section of the Related Art, through converting LMM and LMR frames by the single end LM protocol depicted in Non-Patent Document 1, it is possible to calculate the frame loss number in the forward direction and reverse direction between the transmission devices 10a and 10d which are the both end points (MEP). First, the first LMM frame containing the latest transmission counter value TxFCf (a1) of the device itself is transmitted from the transmission device 10a towards the transmission device 10d (step S200a).

The transmission device 10d upon receiving the first LMM frame adds the latest reception counter value RxFCf (d1) of the device itself to the received first LMM frame (step S200d), generates the first LMR frame that is the response for the first LMM frame, adds the latest transmission counter value TxFCb (d1) of the device itself, and transmits it towards the transmission device 10a (step S201d).

The transmission device 10a upon receiving the first LMR frame refers to the latest reception counter value RxFCb (a1) (step S201a). Then, the transmission device 10a transmits the second LMM frame after a waiting time (e.g., 100 msec) defined in advance has passed from the transmission of the first LMM frame (step S202a). The second LMM frame contains the transmission counter value TxFCf (a2).

As in steps S200d and S201d described above, the transmission device 10d upon receiving the second LMM frame adds the latest reception counter value RxFCf (d2) to the received second LMM frame (step 202d), generates a second LMR frame that is the response for the second LMM frame, adds the latest transmission counter value TxFCb (d2) of the device itself, and transmits it to the transmission device 10a (step S203d).

The transmission device 10a upon receiving the second LMR frame refers to the latest reception counter value RxFCb (a2) (step S203a), and calculates the frame loss number by following Expression 2. Note, however, that ∥ shows that it is an arithmetic operation between modulo 32 (32-bit integer with no signs). For example, |0x000000001−0xFFFFFFFF|=2.

(Expression 2)

Forward direction frame transmission number = $|TxFCf(a2) - TxFCf(a1)|$

Forward direction frame loss number =

$|TxFCf(a2) - TxFCf(a1)| - |RxFCf(d2) - RxFCf(d1)|$

Reverse direction frame transmission number = $|TxFCb(d2) - TxFCb(d1)|$

Reverse direction frame loss number =

$|TxFCb(d2) - TxFCb(d1)| - |RxFCb(a2) - RxFCb(a1)|$

The calculations described heretofore are the same as the calculations of the related techniques described in the section of the Related Art. In addition to that, as shown in steps S106 to 107 of FIG. 3 and FIG. 4, this embodiment adds the processing for copying the same frames by the transmission devices 10b and 10c as the relay devices when transferring the LMM frame and the LMR frame and adding the latest transmission counter value RxFCf or RxFCb of the device itself to the copied frames. This will be described further by referring to FIG. 5.

The first LMM frame transmitted in step S200a is copied within the transmission device 10b and stored to the reception queue 12a along with the latest reception counter value RxFCf (b1) (step S200b). Similarly, when transmitting through the transmission device 10c, the copied first LMM frame is also stored to the reception queue 12a along with the latest reception counter value RxFCf (c1) (step S200c). The original first LMM frame is transmitted towards the transmission device 10d from the transmission device 10c as it is.

The first LMR frame transmitted in step S201d is copied within the transmission device 10c and stored to the reception queue 12a along with the latest reception counter value RxFCb (c1) (step S201c). Similarly, when transmitting through the transmission device 10b, the copied first LMR frame is also stored to the reception queue 12a along with the latest transmission counter value RxFCb (b1) (step S201b). The original first LMR frame is transmitted towards the transmission device 10a from the transmission device 10b as it is.

As in the case of the first LMM frame, the second LMM frame transmitted in step S202a is copied within the transmission device 10b and stored to the reception queue 12a along with the latest transmission counter value RxFCf (b2) (step S202b). Similarly, when transmitting through the transmission device 10c, the copied second LMM frame is also stored to the reception queue 12a along with the latest reception counter value RxFCf (c2) (step S202c). The original second LMM frame is transmitted towards the transmission device 10d from the transmission device 10c as it is.

As in the case of the first LMR frame, the second LMR frame transmitted in step S203d is copied within the transmission device 10c and stored to the reception queue 12a along with the latest reception counter value RxFCb (c2) (step S203c). Similarly, when transmitting through the transmission device 10b, the copied first LMR frame is also stored to the reception queue 12a along with the latest transmission counter value RxFCb (b2) (step S203b). The original second LMR frame is transmitted towards the transmission device 10a from the transmission device 10b as it is.

The transmission device 10b executes arithmetic calculations shown in following Expression 3 by using the counter values stored in the reception queue 12a through the above-described processing. Further, the transmission device 10c executes arithmetic calculations shown in following Expression 4. This makes it possible to calculate the packet loss ratios in the transmission sections before and after the transmission device 10b (or 10c) that is the relay device.

That is, in a case of the transmission device 10b, it is possible to calculate the packet loss ratio (=frame loss number÷frame transmission number) in each of the forward and reverse directions of "section a→b" and "section b→d". In a case of the transmission device 10c, it is possible to calculate the packet loss ratio in each of the forward and reverse directions of "section a→c" and section c→d".

(Expression 3)

Forward direction frame transmission number$_{[section\ a \to b]}$ =

$|TxFCf(a2) - TxFCf(a1)|$

Forward direction frame loss number$_{[section\ a \to b]}$ =

$|TxFCf(a2) - TxFCf(a1)| - |RxFCf(b2) - RxFCf(b1)|$

Reverse direction frame transmission number$_{[section\ b \leftarrow d]}$ =

$|TxFCb(d2) - TxFCb(d1)|$

Reverse direction frame loss number$_{[section\ b \leftarrow d]}$ =

$|TxFCb(d2) - TxFCb(d1)| - |RxFCb(b2) - RxFCb(b1)|$ (Expression 4)

Forward direction frame transmission number$_{[section\ a \to c]}$ =

$|TxFCf(a2) - TxFCf(a1)|$

Forward direction frame loss number$_{[section\ a \to c]}$ =

$|TxFCf(a2) - TxFCf(a1)| - |RxFCf(c2) - RxFCf(c1)|$

Reverse direction frame transmission number$_{[section\ c \leftarrow d]}$ =

$|TxFCb(d2) - TxFCb(d1)|$

Reverse direction frame loss number$_{[section\ c \leftarrow d]}$ =

$|TxFCb(d2) - TxFCb(d1)| - |RxFCb(c2) - RxFCb(c1)|$

The calculation processing shown in above-described Expressions 3 and 4 is the details of the processing shown in steps S106 and 107 of FIG. 3 and FIG. 4. The forward direction frame transmission number and the forward direction frame loss number calculated by Expressions 3 and 4 are transmitted from the communication management units 17 of the transmission devices 10a to d towards the operation management device 20 via the management network 31 with the processing shown in step S108 of FIG. 3 and FIG. 4.

Thereby, the operation management device 20 can calculate the frame transmission number and the frame loss number of each section for an arbitrary segment out of the transmission devices 10a to d. Following Expression 5 is a calculation regarding the frame loss number in the section as a way of example.

(Expression 5)

Forward direction frame loss number$_{[section\ b \to c]}$ =

Forward direction frame loss number$_{[section\ a \to c]}$ −

Forward direction frame loss number$_{[section\ a \to b]}$ =

$|TxFCf(a2) - TxFCf(a1)| - |RxFCf(c2) - RxFCf(c1)| -$ $(|TxFCf(a2) - TxFCf(a1)| -$ $|RxFCf(b2) - RxFCf(b1)|) =$ $|RxFCf(b2) - RxFCf(b1)| - |RxFCf(c2) - RxFCf(c1)|$

For the other sections and the frame transmission number as well as the frame loss number in the reverse direction, the same can be employed for the calculations thereof. Thus, regardless of the forward or reverse direction, the packet loss ratio (=frame loss number÷frame transmission number) can be acquired for the segment between arbitrary devices out of the transmission devices 10a to d. With this action, it is possible to acquire the frame loss in arbitrary sections for both the forward and reverse directions in the same manner regardless of the number of transmission devices 10 provided on the transmission path 30.

Overall Actions of Embodiment

Next, overall actions of the above embodiment will be described.

The packet loss ratio measurement method according to the embodiment is used in the transmission system (transmission network 1) which includes, on the transmission path 30, a plurality of transmission devices 10 that transfer the data frame received from another device to the next device, thereby sequentially transferring the data frame on the transmission path. In the method: the frame analysis unit of the transmission device receives the data frame transmitted from another device via the transmission path and analyzes the type of the data frame (FIG. 4: steps S101 and 102); when the data frame is an OAM frame, the frame analysis unit of the transmission device copies the OAM frame (FIG. 4: step S106); the count processing unit of the transmission device stores the received frame number contained in the data frame to the storage module provided in advance (FIG. 4: step S103); the OAM processing unit of the transmission device calculates the packet loss ratio on the transmission path by using the copied OAM frame and the received frame number stored in the storage module (FIG. 4: steps S107 and 108); and the output line end portion of the transmission device outputs the data frame towards the next device (FIG. 4: step S105).

Note here that each of the above-described steps may be put into programs to be executed by a computer, and may have those executed by the transmission device 10 which directly executes each of the steps. The program may be recorded on a non-transitory recording medium such as a DVD, a CD, a flash memory, or the like. In that case, the program is read out from the recording medium and executed by a computer. Through this operation, the embodiment can provide following effects.

The embodiment makes it possible to measure the packet loss ratio between arbitrary devices on the transmission path through copying the loss-measurement OAM frame on the transmission device 10 without setting the fragmented MEGs and without adding new data to the OAM frame.

Figure 9:
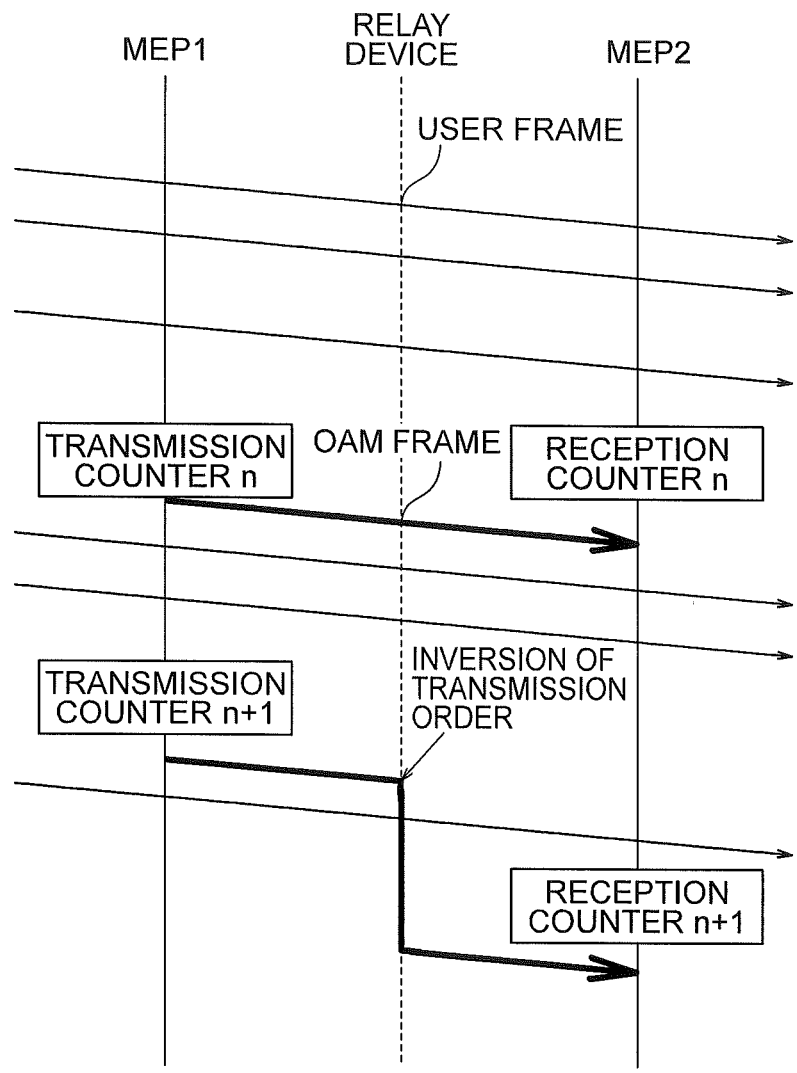
FIG. 9 is an explanatory chart showing an example where inversion of the frame transmission order occurs in a relay device existing in the middle of MEG on the transmission path in the packet loss ratio measurement method depicted in Non-Patent Document 1 shown in FIG. 6 to FIG. 8.

The processing required for the frame analysis unit 12 for copying the OAM frame is only to discriminate and copy the OAM frame. Thus, it is possible to achieve the processing with simple hardware that is about the same-level hardware used for normal frame transfer processing and in short time that is about same length of time required for the normal frame transfer processing. Therefore, deterioration in the frame transfer performance, inversion of the frame transfer order described in FIG. 9, and the like do not occur.

Further, it is possible to employ the embodiment without changing the data format of the LM protocol defined as the international standard in Non-Patent Document 1 at all. New data is not added to the OAM frame, so that the increase in the band described in the section of the issue to be solved by the present invention does not occur. Further, even when the transmission devices 10a and 10d as MEPs are the devices which do not employ the present invention, no issues regarding the mutual connection are to be generated.

First Expansion of Embodiment

Various expansions are possible for the embodiment of the present invention described above. Hereinafter, the typical expansion modes will be described among those. For example, while the packet loss ratio is measured by using the single end LM protocol as the OAM frame in the embodiment described above, the single end LM protocol may be replaced with a dual end LM protocol. Hereinafter, this will be described in more details.

In Non-Patent Document 1, the dual end LM protocol is also defined in addition to the single end LM protocol used in the embodiment described above. The dual end LM protocol is one-way (unidirectional) protocol with which MEPs at both ends transmit unidirectional-messages asynchronously.

The embodiment described above is the technique which measures the frame loss number for the transmission directions of the OAM frame by using the loss-measurement OAM frame received at the relay device. As depicted in FIG. 5, the loss number in the direction of a→d is acquired by the LMM frame reception result, and the loss number in the direction of is acquired by the LMR frame reception result. That is, the target OAM frame may be of any protocols, i.e., the two-way protocol and the one-way protocol.

Therefore, it is possible to measure the packet loss ratio by employing completely the same method as that of the embodiment described above for the dual end LM protocol. Thus, specific structures thereof and the like are completely the same as those of the embodiment described above except that the single end LM protocol is replaced with the dual end LM protocol, so that explanations thereof are omitted.

Second Expansion of Embodiment

Further, while the count processing unit stores the received frame number in the storage module 18 in the embodiment described above, a time stamp value contained in the data frame may be stored instead of the received frame number and the OAM processing unit may calculate the delay time instead of the packet loss ratio. Hereinafter, this will be described in more details.

Other than the above-described LM protocol, one-way DM (Delay Measurement) protocol and two-way DM protocol as the methods for measuring the delay time in a network are defined in Non-Patent Document 1. The DM protocols are the methods similar to those of the packet loss ratio, which measure the delay time regarding transmission on the network by using time stamp values instead of the counter values.

That is, when calculating the delay time by transferring the time stamp values to the reception queue instead of the counter values in the case of a delay-measurement OAM frame, it is possible to calculate the delay time in an arbitrary section on the transmission path through employing completely the same method as that of the embodiment. Regarding the structures of the device and the specific calculation expressions, simply the "packet loss ratio" described in the above embodiment may be replaced with the "delay time" and the "counter value" may be replaced with the "time stamp value". Therefore, explanations of the specific structures and the like are omitted.

While the present invention has been described above by referring to the specific embodiment shown in the drawings, the present invention is not limited only to the embodiment described above. Any other known structures can be employed, as long as the embodiments of the present invention can be achieved therewith.

Regarding the embodiment described above, the new technical contents of the above-described embodiments can be summarized as follows. While a part of or a whole part of the embodiment can be summarized as follows as the new techniques, the present invention is not necessarily limited only to the followings.

Supplementary Note 1

A transmission system which includes, on a transmission path, a plurality of transmission devices which transmit a data frame received from another device to a next device, thereby sequentially transmitting the data frame on the transmission path, wherein
each of the transmission devices includes:
a frame analysis unit which receives the data frame transmitted from another device via the transmission path and analyzes a type of the data frame;
a count processing unit which stores a received frame number contained in the data frame to a storage module provided in advance;
an output line end portion which outputs the data frame towards the next device; and
an OAM processing unit which calculates a packet loss ratio on the transmission path by using the received frame number, wherein
the frame analysis unit includes a function which, when the data frame is an OAM frame, copies the OAM frame, and
the OAM processing unit includes a function which calculates the packet loss ratio on the transmission path by using the copied OAM frame and the received frame number stored in the storage module.

Supplementary Note 2

The transmission system as depicted in Supplementary Note 1, wherein
the frame analysis unit of the transmission device includes a function which outputs a loss-measurement OAM frame that is an original of the copy to the output line end portion as it is after copying the OAM frame.

Supplementary Note 3

The transmission system as depicted in Supplementary Note 1, which includes an operation management device which receives and totalizer the packet loss ratios on the transmission path calculated in each of the transmission devices to calculate the packet loss ratio between each of the transmission devices.

Supplementary Note 4

The transmission system as depicted in Supplementary Note 1, wherein
the packet loss ratio is calculated by using the OAM frame with a single end LM (Loss Measurement) protocol or a dual end LM protocol.

Supplementary Note 5

The transmission system as depicted in Supplementary Note 1, wherein:
the count processing unit of the transmission device stores a time stamp value contained in the data frame to a storage module provided in advance instead of the received frame number; and
the OAM processing unit of the transmission device calculates delay time on the transmission path instead of the packet loss ratio.

Supplementary Note 6

A transmission device transmitting a data frame received from another device to a next device, a plurality of which being disposed on a transmission path, and the transmission device includes:
a frame analysis unit which receives the data frame transmitted from another device via the transmission path and analyzes a type of the data frame;
a count processing unit which stores a received frame number contained in the data frame to a storage module provided in advance;
an output line end portion which outputs the data frame towards the next device; and
an OAM processing unit which calculates a packet loss ratio on the transmission path by using the received frame number, wherein
the frame analysis unit includes a function which, when the data frame is an OAM frame, copies the OAM frame, and
the OAM processing unit includes a function which calculates the packet loss ratio on the transmission path by using the copied OAM frame and the received frame number stored in the storage module.

Supplementary Note 7

A packet loss ratio measurement method used in a transmission system which includes, on a transmission path, a plurality of transmission devices which transmit a data frame received from another device to a next device, thereby sequentially transmitting the data frame on the transmission path, wherein:
a frame analysis unit of the transmission device receives the data frame transmitted from another device via the transmission path and analyzes a type of the data frame;
when the data frame is an OAM frame, the frame analysis unit of the transmission device copies the OAM frame;
a count processing unit of the transmission device stores a received frame number contained in the data frame to a storage module provided in advance;
the OAM processing unit of the transmission device calculates a packet loss ratio on the transmission path by using the copied OAM frame and the received frame number stored in the storage module; and
an output line end portion of the transmission device outputs the data frame towards the next device.

Supplementary Note 8

A packet loss ratio measurement program used in a transmission system which includes, on a transmission path, a plurality of transmission devices which transmit a data frame received from another device to a next device, thereby sequentially transmitting the data frame on the transmission path, and the program causes a computer provided to the transmission device to execute:

a procedure for receiving the data frame transmitted from another device via the transmission path and analyzing a type of the data frame;

when the data frame is an OAM frame, a procedure for copying the OAM frame;

a procedure for storing a received frame number contained in the data frame to a storage module provided in advance;

a procedure for calculating a packet loss ratio on the transmission path by using the copied OAM frame and the received frame number stored in the storage module; and a procedure for outputting the data frame towards the next device.

This Application claims the Priority right based on Japanese Patent Application No. 2011-147856 filed on Jul. 4, 2011 and the disclosure thereof is hereby incorporated by reference in its entirety.

INDUSTRIAL APPLICABILITY

The present invention can be broadly employed for a transmission path on which data is transmitted. More specifically, the present invention can be employed for a transmission path using the Ethernet OAM. The transmission methods of the transmission path may be arbitrary methods such as an optical cable, a metal cable, a radio communication, and the like.

REFERENCE NUMERALS

1 Transmission network
10, 10a, 10b, 10c, 10d Transmission device
11 Input line end portion
12 Frame analysis unit
12a Reception queue
13 Count processing unit
13a Reception counter
14 Switch processing unit
14a Transfer destination table
15 Output line end portion
16 OAM processing unit
17 Communication management unit
18 Storage module
19a, 19b Input/output port
20 Operation management device
30 Transmission path
31 Management network

The invention claimed is:

1. A transmission system comprising, on a transmission path, a plurality of transmission devices which transmit a data frame received from another device to a next device, thereby sequentially transmitting the data frame on the transmission path, wherein each of the transmission devices comprises:

a frame analyzer configured to receive the data frame transmitted from another device via the transmission path and to analyze a type of the data frame;

a count processor configured to store a received frame number contained in the data frame to a storage module provided in advance;

an output line end portion configured to output the data frame towards the next device; and an Operations, Administrations, Maintenance (OAM) processor configured to calculate a packet loss ratio on the transmission path by using the received frame number, wherein the frame analyzer includes a function which, when the data frame comprises an OAM frame, copies the OAM frame, and wherein the OAM processor includes a function which calculates the packet loss ratio on the transmission path by using the copied OAM frame and the received frame number stored in the storage module.

2. The transmission system as claimed in claim 1, wherein the frame analyzer of the transmission device includes a function which outputs a loss-measurement OAM frame that includes an original of the copy to the output line end portion as it is after copying the OAM frame.

3. The transmission system as claimed in claim 1, further comprising an operation management device which receives and totalizes the packet loss ratios on the transmission path calculated in each of the transmission devices to calculate the packet loss ratio between each of the transmission devices.

4. The transmission system as claimed in claim 1, wherein the packet loss ratio is calculated by using the OAM frame with a single end LM (Loss Measurement) protocol or a dual end LM protocol.

5. The transmission system as claimed in claim 1, wherein the count processor of the transmission device stores a time stamp value contained in the data frame to a storage module provided in advance instead of the received frame number, and wherein the OAM processor of the transmission device calculates a delay time on the transmission path instead of the packet loss ratio.

6. A transmission device transmitting a data frame received from another device to a next device, a plurality of which being disposed on a transmission path, the transmission device comprising:

a frame analyzer configured to receive the data frame transmitted from another device via the transmission path and to analyze a type of the data frame;

a count processor configured to store a received frame number contained in the data frame to a storage module provided in advance;

an output line end portion configured to output the data frame towards the next device; and an Operations, Administrations, Maintenance (OAM) processor configured to calculate a packet loss ratio on the transmission path by using the received frame number, wherein the frame analyzer includes a function which, when the data frame comprises an OAM frame, copies the OAM frame, and wherein the OAM processor includes a function which calculates the packet loss ratio on the transmission path by using the copied OAM frame and the received frame number stored in the storage module.

7. A packet loss ratio measurement method used in a transmission system which comprises, on a transmission path, a plurality of transmission devices which transmit a data frame received from another device to a next device, thereby sequentially transmitting the data frame on the transmission path, the packet loss ratio measurement method comprising:

receiving, by a frame analyzer of the transmission device, the data frame transmitted from another device via the transmission path and analyzes a type of the data frame;

when the data frame comprises an Operations, Administrations, Maintenance (OAM) frame, copying, by the frame analyzer of the transmission device, the OAM frame;

storing, by a count processor of the transmission device, a received frame number contained in the data frame to a storage module provided in advance;

calculating, by an OAM processor of the transmission device, a packet loss ratio on the transmission path by using the copied OAM frame and the received frame number stored in the storage module; and outputting, by an output line end portion of the transmission device, the data frame towards the next device.

8. A non-transitory computer readable recording medium storing a packet loss ratio measurement program used in a transmission system which comprises, on a transmission path, a plurality of transmission devices which transmit a data frame received from another device to a next device, thereby sequentially transmitting the data frame on the transmission path, the program causing a computer provided to the transmission device to execute:

receiving the data frame transmitted from another device via the transmission path and analyzing a type of the data frame;

when the data frame comprises an Operations, Administrations, Maintenance (OAM) frame, copying the OAM frame;

storing a received frame number contained in the data frame to a storage module provided in advance;

calculating a packet loss ratio on the transmission path by using the copied OAM frame and the received frame number stored in the storage module; and outputting the data frame towards the next device.

9. A transmission system comprising, on a transmission path, a plurality of transmission devices which transmit a data frame received from another device to a next device, thereby sequentially transmitting the data frame on the transmission path, wherein each of the transmission devices comprises:

frame analysis means for receiving the data frame transmitted from another device via the transmission path and analyzing a type of the data frame;

count processing means for storing a received frame number contained in the data frame to a storage module provided in advance;

output line end portion means for outputting the data frame towards the next device; and Operations, Administrations, Maintenance (OAM) processing means for calculating a packet loss ratio on the transmission path by using the received frame number, wherein the frame analysis means includes a function which, when the data frame comprises an OAM frame, copies the OAM frame, and wherein the OAM processing means includes a function which calculates the packet loss ratio on the transmission path by using the copied OAM frame and the received frame number stored in the storage module.

10. A transmission device transmitting a data frame received from another device to a next device, a plurality of which being disposed on a transmission path, the transmission device comprising:

frame analysis means for receiving the data frame transmitted from another device via the transmission path and analyzing a type of the data frame;

count processing means for storing a received frame number contained in the data frame to a storage module provided in advance;

output line end portion means for outputting the data frame towards the next device; and Operations, Administrations, Maintenance (OAM) processing means for calculating a packet loss ratio on the transmission path by using the received frame number, wherein the frame analysis means includes a function which, when the data frame comprises an OAM frame, copies the OAM frame, and wherein the OAM processing means includes a function which calculates the packet loss ratio on the transmission path by using the copied OAM frame and the received frame number stored in the storage module.

* * * * *